United States Patent Office 3,043,751
Patented July 10, 1962

3,043,751
PROCESS AND EQUIPMENT FOR DETERMINING MICROBIAL SENSITIVITY TO ANTI-MICROBIAL AGENTS
Leon S. Goldman, Brooklyn, N.Y., assignor of ten percent to Harold C. Herman, Los Angeles, Calif.
No Drawing. Filed Mar. 14, 1960, Ser. No. 14,572
18 Claims. (Cl. 195—103.5)

This invention relates to means for determining the viability of microorganisms, and more specifically, to equipment including chemical indicators embedded in an inert supporting medium such as filter paper for the determination of microbial sensitivity to antimicrobial agents.

Heretofore, various redox indicators, such as the various tetrazolium salts or methylene blue, have found limited application in determining the viability of microorganisms. Methods have also been devised for the detection of bacterial sensitivity to antibiotics by employing redox indicators. The use of these indicators has been greatly limited due to their pronounced toxicity to many microorganisms. In view of this toxicity, the redox indicators are generally added to a culture medium after a substantial growth has been obtained in order to detect the presence of the microorganisms. Redox indicators are occasionally added to a culture medium prior to inoculation only when a specific known organism (or family of organisms) which is not sensitive to the lethal action of the particular indicator is being isolated or identified. When added prior to inoculation, the indicators accordingly act as selective inhibitors. Heretofore, therefore, a redox indicator could not be added to an unkown organism in a culture medium prior to inoculation in order to detect the growth or viability of the unknown organism.

More specifically, the determination of microbial sensitivity to antimicrobial agents has, heretofore, been performed in the following manners:

(1) *Serial dilution method.*—A series of nutrient broths is prepared for a particular antibiotic in increasing concentration of antibiotic. Each broth is then inoculated with the same organism and the minimum concentration of antibiotic that will inhibit growth is determined after a suitable time by the growth or turbidity produced. The serial dilution method is reliable but time consuming and expensive. In addition, a long time must elapse before results are interpreted. The method is not used routinely but is limited to research.

(2) *Agar diffusion method.*—A melted nutrient agar is inoculated with bacteria isolated from the patient and poured into sterile plates. Filter paper discs impregnated with various antibiotics are then spaced on the surface of the agar and the zones of inhibition are noted for each antibiotic after a period of incubation. The agar diffusion method has been limited to hospitals because the gel shrinks and dries on storage and easily becomes contaminated. Moreover, at least 18 to 24 hours must elapse for rapidly growing organisms before results are interpreted.

(3) *Post-addition method.*—A series of broths is prepared containing various antibiotics and inoculated with the same organism. A redox indicator is added after a period of inoculation to determine the inhibitory nature of the various antibiotics. The method is reliable but time consuming and expensive.

(4) *Fermentation method.* — Many microorganisms have the ability to ferment certain carbohydrates, resulting in the production of acid, and the detection of said acid in the culture medium with pH indicators has been suggested as a method of determining the viability of these mircoorganisms, particularly in the presence of selected antibiotics. This method cannot be considered as a reliable procedure for testing unknown microorganism because many microorganisms do not ferment any carbohydrate and in some cases where fermentation does occur, it is not accompanied by the production of acid.

(5) *Blood-agar method.*—Blood agar has also been suggested for the determination of viability of bacteria and for the determination of bacterial sensitivity to antibiotics. The bright red color of the oxyhemoglobin in the blood acts as the indicator, turning to the somewhat darker red color of reduced hemoglobin in the presence of living bacteria. The disadvantages of this method are numerous including that the color changes are not distinct and not clearly defined; that the preparation of blood-agar is a relatively difficult procedure; that the blood-agar plates must be refrigerated and have a rather limited storage life; that in mixed infections the presence of a secondary hemolytic organism may completely obscure the results of the primary organism by destroying the hemoglobin; and that, as recommended, at least 12 to 48 hours must elapse before interpreting the results.

In a copending patent application Serial No. 575,083, filed on March 30, 1956, now abandoned, by the same inventor, a redox indicator and various antibiotics are bound to filter paper by an insoluble resin material. Due to the bond of the resin, the redox indicator is effectively at a sub-lethal concentration, but is slowly released after the inoculated solution has wetted the paper to provide the color indication.

In the specific illustrative embodiments of this invention, a new type of redox indicator is provided which acts in the detection of reductases of living microorganisms, and has the unique property of being non-toxic in high concentrations to the living microorganisms. The new indicator is prepared from cationic redox indicators such as methylene blue, neutral red, etc., or from any of the numerous tetrazolium salts, by forming an extremely insoluble salt of the cationic redox indicator with an anionic precipitant of high molecular weight. The anionic precipitant is an alkaloidal reagent which is an acid having the property of precipitating alkaloids, for example, codeine, strychnine, morphine, etc. Alkaloids contain cationic groups of high molecular weight and the resulting salt formed is insoluble in water. Alkaloidal reagents also precipitate proteins, heavy metal ions, and generally organic ions which are positively charged (cations) and of high molecular weight.

Features of this invention relate to the utilization of an excess of the negatively charged anionic precipitant in the presence of a mineral acid which is mixed with the positively charged redox indicator.

The insoluble salt may be deposited into the fibers of an inert nontoxic supporting material such as filter paper. When the treated supported material is in contact with living microorganisms, the insoluble indicator in no way affects the growth of the living organisms but is, however, affected by the reductases released by the living organisms, thereby changing the color of the supporting material. The insoluble salt supported in the fibers of the filter paper is nontoxic to living microorganism and, therefore, can readily be utilized to determine the viability of an unknown microorganism. There is no selective toxicity, and in fact, there isn't even a reduced toxicity because the insoluble salts do not in any way affect the viability of the living microorganism. The insoluble salt is nontoxic even though the original two reactants, the cationic redox indicator and the anionic precipitant, are both appreciably soluble in water and highly toxic by themselves.

Though numerous reports have appeared in the literature emphasizing the fact that redox indicators are incompatible with the growth of many microorganisms, the redox indicator of this invention does not, as indicated above, affect the growth of microorganisms. In general, these reports indicate that the redox indicators inhibit growth because of their ability to sidetrack the normal mechanisms of electron transfer which leads to formation of high-energy phosphate bonds. The cumulative opinion of these reports is that it appears useless to search for a better indicator of this type.

The objects of the invention, accordingly, are to provide a new combination of matter that will act as a redox indicator, being nontoxic to microorganisms regardless of the nature of the organism or the concentration of the indicator; to provide for the addition of a redox indicator to a culture medium prior to inoculation to detect the growth of microorganisms and to follow the progress of said growth for any desired reason by noting the variations in the color of said redox indicator with time; to provide for a method of determining the viability of microorganisms in a relatively short period of time, from 3 to 6 hours for many bacteria and from 12 to 24 hours for many of the slowly growing yeasts and molds; to provide the materials necessary for the production of vivid and striking color changes in short periods of time in the determination of microbial sensitivity to antimicrobial agents; and to provide a method and apparatus for the determination of microbial sensitivity to antimicrobial agents that which is rapid and reliable and which lends itself to routine use by the medical and allied professions.

In accordance with the present invention, one specific embodiment of the method of preparing nontoxic redox indicator is as follows:

A solution of triphenyltetrazolium chloride may be prepared in N,N-dimethyl formamide, approximatey one percent in concentration. To this solution may be added an equal volume of an approximately 40 percent solution of silicotungstic acid in the same solvent. Concentrated hydrochloric acid may then be added slowly to the above-mentioned cooled mixture, until a dense white precipitate appears in the container, consisting of the silicotungstic salt of triphenyltetrazolium and some free silicotungstic acid, both substances being insoluble in the presence of excess hydrochloric acid. The hydrochloric acid is added slowly to the cooled mixture in order to minimize the hydrolysis of the solvent (the N,N-dimethyl formamide). Other mineral acids, like sulfuric or nitric acids, may also be utilized. In place of N,N-dimethyl formamide, water, methyl alcohol, etc.; the nature of the solvent not being important as long as it is able to dissolve the two reactants and in which the silicotungstic acid is very soluble. It is essential that for optimum results a great excess of silicotungstic acid be used to precipitate the triphenyltetrazolium chloride; otherwise a salt will form which is still fairly toxic to microorganisms. In all probability, the new indicator is precipitated, not as a simple salt, but as a complex with some free silicotungstic acid tightly held to the salt. This is the reason for using a great excess of silicotungstic acid in the presence of strong mineral acid. For equal volumes, the concentration of the silicotungstic acid should be at least 10 times as great as the concentration of the triphenyltetrazolium chloride. A ratio of concentrations of 40 is illustrative. There is no upper concentration limit of the silicotungstic acid.

The mixture, including the insoluble salt may then be placed in a centrifuge and washed several times with methyl alcohol which dissolves everything except the insoluble silicotungstic acid salt of triphenyltetrazolium. The precipitate may also be washed with water or ethyl alcohol. Repeated washing is to be avoided because it may remove the free silicotungstic acid which is in complex with the salt and render the final compound toxic. The silicotungstic acid salt of triphenyltetrazolium, which is hereinafter referred to as "Indicator I," may then be dissolved in fresh N,N-dimethyl formaminde, to a concentration of approximately 2 percent, and is centrifuged again to remove any sediment. The resulting solution which is colorless is decanted into a clean, dry container.

When a quantity of this colorless solution is placed on a piece of blotter paper and the paper is dried in an oven at approximately 60° C. for about one hour, the solvent is completely evaporated, thus leaving "Indicator I" in the fibers of the paper as a colorless residue and as an integral part of the paper. When a portion of this treated paper is exposed to viable microorganisms enzyme activity like succinic dehydrogenase, flavoprotein activity, and/or reduced diphosphopyridine nucleotide, etc., will turn "Indicator I" from colorless to the red formazan without disturbing the growth of the microorganisms.

The preparation of a nontoxic insoluble redox indicator is by no means limited to the use of the cationic indicator triphenyltetrazolium chloride or to the use of the alkaloidal reagent silicotungstic acid. Any cationic redox indicator such as methylene blue, neutral red, neotetrazolium chloride, tetrazolium red, tetrazolium blue, iodonitrotetrazolium chloride, etc., may be employed. Furthermore, as an anionic precipitant, one may employ one of the numerous isopoly acids of high molecular weight like tungstic acid, molybdic, vanadic, etc.; or one of the numerous heteropolyacids like arsenophosphotungstic acid, phosphomolybdic acid, silicomolybdic acid, etc. The important criteria in producing a nontoxic final product is:

(1) Very highly insoluble in water.
(2) Stable. Does not decompose in the presence of water (hydrolyze).
(3) Since "solubility" is a relative term, it is agreed that even the most "insoluble" substance is still "soluble" to a certain extent. It is important, therefore, that whatever minute quantity of material does go into solution does not dissociate to the corresponding positive and negative ions (ionization).

The numerous isopoly and heteropoly acids are very effective in meeting the above-mentioned requirements. Some alkaloidal reagents, however, like tannic acid, sulfosalicylic acid, and ferrocyanic acid, will produce a toxic salt with the cationic redox indicators. These salts are fairly toxic, probably because they are either appreciably soluble in water or hydrolyze readily so that the salt then may ionize to liberate the original components (both of which are toxic), or the salt may not form a complex with the free acid (alkaloidal reagent).

Some of the alkaloidal reagents, accordingly, produce salts which are fairly toxic. The term alkaloidal reagents includes, therefore, acids which produce fairly toxic as well as nontoxic salts. The polyacids, which are alkaloidal reagents, refer to inorganic acids composed of more than one acidic radical. The term isopolyacids refers to inorganic acids composed of one kind of acidic radical (e.g. tungstic acid). If one of the radicals is derived from another negative element, the term heteropolyacid is utilized to describe the reagent. The silicotungstic acid is a heteropolyacid. Another heteropolyacid is phosphomolybdic acid.

The polyacids and, more particularly, the isopolyacids, also include simple acids of low molecular weight (like $H_2S_2O_7$, $H_2P_2O_7$, etc.). The present invention is concerned particularly with the polyacids of the heavy metals (like tungsten, molybdenum, vanadium, etc.). It is also distictive of heteropolyacids that a single radical of one of the acids is united with many, perhaps 12 radicals derived from a second acid. This characteristic of heteropolyacids is a desirable feature because a highly complex anion of very high molecular weight is produced. Both isopolyacids and heteropolyacids of high molecular weight produce nontoxic salts but the heteropolyacids produce salts which are even more insoluble than do the isopolyacids because of the complexity of the produced anion and are, therefore, more desirable.

With redox indicators which may be easily reversibly oxidized and reduced, the resulting insoluble salt will also be easily reversibly oxidized and reduced. Hence, a reversible indicator like methylene blue, while converted to a nontoxic insoluble form by the treatment outlined above, will be readily reduced to the colorless form in the presence of living microorganisms, but the color will return when the colorless indicator is reoxidized in the presence of air. Redox indicators such as methylene blue should, therefore, be utilized in sealed containers or under anaerobic conditions. The cationic redox indicators such as the various tetrazolium salts, which do not readily reoxidize in the presence of oxygen can be employed in the presence of oxygen. The anionic precipitant will precipate and render insoluble any substance of high molecular weight and in particular any of the cationic redox indicators. If triphenyltetrazolium or any of its derivatives are utilized, they are colorless in the oxidized state and red or blue in the reduced state. The reverse situation is present for many other redox indicators and some are converted to a different color when reduced. Any redox indicator may be utilized with those that are readily reversibly oxidized and reduced being utilized as indicated above in sealed containers. Depending, therefore, upon the particular cationic redox indicator and upon the particular polyacid, different insoluble redox indicators may be prepared.

The toxicity of the insoluble indicator may be checked on several test microorganisms. The combination of triphenyltetrazolium with silicotungstic acid has been found to be highly satisfactory (extremely insoluble, non-ionizable, nontoxic, and produces a deep-red formazan on reduction) and subsequently "Indicator I" will be referred to herein as the representative new composition of matter with the understanding that it merely illustrates only one of the numerous combinations of cationic redox indicators with anionic precipitants.

"Indicator I," imbedded in filter paper or any nontoxic inert material of similar nature, like cloth, asbestos, synthetic nontoxic woven fabric, etc., may now be employed to detect the viability of microorganisms without interfering with their growth. There are numerous applications of this new composition of matter with its interesting properties. "Indicator I" (the insoluble salt) may, for example, be employed in suspension in nutrient broths or gels without the supporting medium for detecting viability. Another application is the employment of "Indicator I" and compounds of similar nature in the manufacture of equipment for the determination of microbial sensitivity to antimicrobial agents.

It is understood that the term "antimicrobial agent" is not necessarily restricted to antibiotics but includes any substance that will interfere with the growth of microorganisms and that the term "microbial" is not necessarily restricted to bacteria but includes such organisms as yeasts and fungi, etc. Stedman's Medical Dictionary defines antimicrobial as antimicrobic, namely, tending to destroy microbes, to prevent their development or to prevent their pathogenic action.

The equipment for the determination of microbial sensitivity to antimicrobial agents may be prepared in the following manner:

A sheet of an inert nontoxic supporting medium, like thick filter paper, is treated with a solution of "Indicator I" in N,N-dimethyl-formamide and dried in an oven at approximately 60° C. for about one hour. The concentration of the indicator in the above solvent is unimportant, about 2% being a convenient value though any concentration from .01% to 50% may be utilized. The paper may be impregnated with said solution, or it may be coated by rolling, stamping, or spraying. The size of the paper is not critical and will be discussed shortly. Furthermore, the nature of the solvent is unimportant, since any solvent that will dissolve the indicator without decomposing it and one that may be conveniently evaporated at relatively low temperatures may be employed. Any strongly polar organic solvent may be utilized: N,N-dimethylformamide, as indicated above, is an example of a solvent with these qualities; other strongly polar organic solvents, like formamide or N,N-diethyl formamide may also be employed, although they do not evaporate as readily as N,N-dimethylformamide.

The process of dissolving "Indicator I" in a solvent, treating said paper with said solution, and evaporating said solvent, thereby impregnating said paper with "Indicator I," is merely an illustrative example of how to impregnate the paper with the redox indicator. Other methods may also be employed. For example, "Indicator I" may be produced directly within the fibers of the paper by first soaking a piece of paper with a very strong solution of the anionic precipitant such as silicotungstic acid, drying the soaked paper, and then immersing the dried paper into a strongly acidified solution of the cationic redox indicator such as the triphenyltetrazolium chloride, of low concentration. The paper is then washed repeatedly, dried and sterilized.

After the "Indicator I" has been imbedded in the paper, minute quantities of various antimicrobial agents are then added to the sterilized paper at premarked areas with a micropipette under aseptic conditions. The antimicrobial agents may be antibiotics such as penicillin, tetracycline, chloromycetin, nystatin, etc., or synthetic biochemical antagonists such as sulfanilamide and its derivatives including sulfadiazine, sulfathiazole, etc., or other chemical substances which inhibit the growth or kill microorganism such as benzalkonium chloride, various phenolics, various organic mercurials, etc. The volume of antimicrobial solution may be approximately 0.01 ml. and it generally dries very rapidly, leaving a residue the size of a small circle about 1 to 2 mm. in diameter. The concentration of antimicrobial agents is comparable to the concentrations now employed in the agar diffusion method, and depends upon the nature of the antimicrobial agent, namely its stability, its potency, it solubility (and, therefore, its diffusibility), etc. The various antimicrobial agents are spaced on the treated paper to allow approximately 1½ inches between the various agents.

The antimicrobial solution may be prepared by dissolving the dry antimicrobial material in methyl alcohol and adding to this solution a quantity of collodion dissolved in alcohol and ether; the volume of the collodion solution being approximately one-fifth the volume of the methyl alcohol. If the antimicrobial agent is insoluble in methyl alcohol, other solvents may be employed. For example, dioxane and acetone may be used as solvents. The function of the collodion is to bind the antimicrobial agent to the paper and to prevent it from being washed completely away from its initial position when the nutrient liquid is subsequently added to the paper. It is understood that collodion is merely an example of many other nontoxic binding agents which may also be employed, such as resins like shellac, rosin, hydrocarbons of high molecular weight, etc.

The nature of "Indicator I" is such that it will assume a deep red color, due to the formation of the formazan, in the presence of any strong reducing agent, not necessarily living microorganisms. Certain antimicrobial agents are strong reducing agents and may consequently interfere with the reliability of the test by turning the indicator red in the absence of living organisms. This difficulty may be eliminated by incorporating a minute quantity of a weak acid such as succinic acid into the antibiotic solution before it is applied to the paper. The succinic acid is acidic enough to prevent the antibiotic from reducing "Indicator I" and yet will not interfere with the reduction of the indicator by the living organisms (when the organism is not sensitive to the antibiotic).

It is also interesting to note that many microorganisms utilize succinic acid in their metabolic processes and so, in many cases, the succinic acid will completely disappear from the site of activity after it has accomplished its goal. The decision as to whether or not to employ succinic acid is best determined by testing the antibiotic in the absence of living organisms; if a red zone forms, the acid should be employed. Other weak acids which may be utilized are citric acid and tartaric acid.

The paper, treated with "Indicator I" and containing the various antimicrobial agents at premarked areas, is now placed into a suitable transparent sterile container. The container may be a standard glass petri dish; in this case the paper is first precut the size of the bottom of the dish. For a standard size dish, about 95 mm. in diameter, about 7 or 8 antimicrobial agents may be tested at one time. Disposable plastic dishes, now commercially available, may also be employed in order to reduce the cost of materials. Features of this invention relate to the use of a flat sterile transparent nontoxic plastic bag instead of a dish. By using a plastic bag, which is sealed on all sides except for a small opening into which the inoculated liquid is poured and sealed, the size of the paper becomes almost unlimited and one may then test scores of antibiotics at one time with minimum cost of materials.

The prepared paper in its dry state, when placed in a closed dish or sealed plastic bag is stable for long periods of time; the paper remaining colorless (or colored if methylene blue or neutral red is used) unless exposed to strong light and the antimicrobial agents retaining their original potencies over long periods of time because of their dry state.

In performing the test, material from an abscess, furuncle, sinus drainage, infected urine, etc., is obtained and the material is added to a prepared vial containing a nutrient broth. The contents are then well shaken to disperse the microorganisms, and the inoculated broth is poured onto the treated paper. For best results, the inoculum should be heavy. Another method is to inoculate a sterile agar plate and then to isolate a pure culture and produce a heavy inoculum prior to the performance of the test. The inoculated dish or plastic bag is then placed in a horizontal position and incubated at body temperature for several hours. In many cases, the results will be dramatic in about three to four hours; the paper turning to a bright red except in those areas where the microorganisms are killed by the diffusing antimicrobial agents. When sensitivity exists, a colorless zone of varying size will be seen on the now red paper. This test is not quantative as the size of the colorless zone is not a measure of the efficacy of the antibiotic. The size of the zone depends on numerous factors, such as rate of growth, rate of diffusion, etc., and the results are interpreted qualitatively as those of the agar diffusion method.

The volume of the nutrient broth is determined by the size and porosity of the paper, and many vials containing premeasured volumes of broth may be prepared and stored indefinitely. The optimum volume is that which will just saturate the paper plus about 5% in excess.

The nature of the nutrient broth is unimportant, since many broths may be employed. A very satisfactory nutrient liquid is commonly known as "brain heart infusion" since it supports the growth of many fastidious organisms and produce early color changes with "Indicator I." When yeasts or molds are tested, a small quantity of penicillin and streptomycin may be added to the nutrient broth before inoculation to inhibit the growth of bacteria without affecting the growth of the yeast or mold.

Occasionally a colorless zone around a paricular antibiotic may be noted and several hours later, or perhaps overnight, the colorless zone becomes much smaller in size or disappears entirely. This may be interpreted to mean that the antimicrobial agent was bacteriostatic and not bactericidal. That is, the agent has arrested the growth of the organism for several hours (hence the appearance of the colorless zone) but the organism was not killed. In time, the antibiotic has diffused over a wide area until it became so dilute that the organism has begun to grow at this stage thereby reducing the size of the colorless zone or turning it completely red. The provision of this phenomenon is an important feature of this invention since it now becomes rather simple to differentiate between the bacteriostatic action and the bactericidal action of antimicrobial agents. Such information is useful clinically and the methods known in the prior art are too involved, time consuming and cumbersome.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

I claim:

1. A highly water-insoluble redox indicator salt for the detection of the viability of microorganisms having the characteristic of being nontoxic to said microorganisms.

2. A highly water-insoluble nontoxic redox indicator for the detection of the viability of microorganisms consisting of the silicotungstic acid salt of triphenyltetrazolium, and a nontoxic inert supporting agent for said salt.

3. A highly water-insoluble nontoxic redox indicator for the detection of the viability of microorganisms consisting of the silicotungstic acid salt of a cationic redox indicator.

4. A highly water-insoluble nontoxic redox indicator for the detection of the viability of microorganisms consisting of an anionic precipitant salt of a cationic redox indicator.

5. A highly water-insoluble nontoxic redox indicator in accordance with claim 4 wherein said anionic precipitant is one of the group of poly acids of high molecular weight consisting of silicotungstic acid, arsenophosphotungstic acid, phosphomolybdic acid and silicomolybdic acid.

6. A highly water-insoluble nontoxic redox indicator in accordance with claim 5 wherein said cationic redox indicator is one of the group consisting of triphenyltetrazolium, the chemical derivatives of triphenyltetrazolium, methylene blue and neutral red.

7. A process of preparing a nontoxic water-insoluble redox indicator including, the steps of adding a substantially equal volume of a relatively concentrated solution of silicotungstic acid to a relatively dilute solution of triphenyltetrazolium chloride in a polar solvent, acidifying with a concentrated mineral acid to the point of precipitation, and separating the silicotungstic acid salt of triphenyltetrazolium formed in the preceding step from the rest of the chemicals in the mixture.

8. A highly water-insoluble nontoxic redox indicator for the detection of the viability of microorganisms consisting of a nontoxic inert supporting agent made of cellulose fibers, and an alkaloidal reagent salt of a cationic redox indicator imbedded in the interstices of the cellulose fibrous supporting agent, said alkaloidal reagent being one of the group consisting of silicotungstic acid and arsenophotungstic acid, said cationic redox indicator being one of the group consisting of triphenyltetrazolium and its chemical derivatives, methylene blue, and neutral red.

9. A highly water-insoluble nontoxic redox indicator for the detection of the viability of microorganisms consisting of a nontoxic inert supporting agent made of cellulose fibers, and an alkaloidal reagent salt of a cationic redox indicator imbedded in the interstices of the cellulose fibrous supporting agent, said alkaloidal reagent being a heteropolyacid of high molecular weight, said cationic redox indicator being one of the group consisting of triphenyltetrazolium and its chemical derivatives, methylene blue, and neutral red.

10. A process of preparing a nontoxic water-insoluble redox indicator, including, the steps of adding a solution of a polyacid of highly molecular weight to a solution of a cationic redox indicator where the equivalents of the polyacid utilized greatly exceeds the number of equivalents of cationic redox indicator, adding a strong mineral acid whereby a mixture is formed including the polyacid salt of the cationic redox indicator, and then separating the polyacid salt of the cationic redox indicator from the rest of the mixture.

11. A process of preparing a nontoxic non-ionizable water-insoluble redox indicator by forming the silicotungstic acid salt of triphenyltetrazolium in an acidified excess of silicotungstic acid.

12. A process of preparing a nontoxic water-insoluble redox indicator by forming the polyacid salt of a cationic redox indicator in the presence of an excess of polyacid acidified with a mineral acid.

13. A process of preparing a nontoxic water-insoluble redox indicator by mixing an alkaloidal reagent from the group consisting of isopolyacids and heteropolyacids with a cationic redox indicator with the alkaloidal reagent being in stoichiometric excess of the redox indicator.

14. A process of preparing a nontoxic water-insoluble redox indicator by mixing an alkaloidal reagent from the group consisting of isopoly acids and heteropolyacids of high molecular weight with a cationic redox indicator with the alkaloidal reagent being in excess of the redox indicator, and then separating and depositing the insoluble salt developed in the mixing process in the fibers of a nontoxic inert fibrous material.

15. Apparatus for determining microbial sensitivity to antimicrobial agents comprising an inert supporting medium impregnated with a highly water-insoluble nontoxic redox indicator, said impregnated supporting medium also being impregnated with various antimicrobial agents in minute premarked areas widely spaced, and a nutrient broth inoculated with microorganisms on said impregnated supporting medium.

16. A process for determining the viability of microorganisms which comprises soaking filter paper in a strong solution of a polyacid, drying said paper, soaking said paper in a dilute acidified solution of a cationic redox indicator, washing and drying said paper, sterilizing said paper, pouring a suspension of the microorganisms under consideration onto the sterilized paper in a sterile container, and then noting any color changes of the paper in order to determine the viability of the microorganisms in the suspension.

17. A method of preparing a highly water-insoluble non-toxic chemical indicator for the determination of reductase activity in microorganisms by reacting the triphenyltetrazolium ion with an alkaloidal reagent of the polyacid group in the presence of an acidified stoichiometric excess of said alkaloidal reagent, whereby a salt is produced composed of said anions and cations, and whereby said salt is in complex and in chemical combination with some free alkaloidal reagent.

18. A process for determining whether an antimicrobial agent is bacteriostatic, bactericidal or nontoxic, to a particular oganism including the steps of preparing polyacid salt of high molecular weight of a cationic indicator, dispersing the salt in a nontoxic supporting medium, and impregnating at least a portion of the nontoxic supporting medium including the salt with the antimicrobial agent, whereby color changes take place indicating whether the antimicrobial reagent is bacteriostatic, bactericidal or nontoxic.

References Cited in the file of this patent

UNITED STATES PATENTS

| 2,713,581 | Pannone et al. | July 19, 1955 |
| 2,794,786 | Segal et al. | June 4, 1957 |

OTHER REFERENCES

"Monographs on Experimental Biology. Oxidation-Reduction Potentials," by Michaelis, 1930, published by J. P. Lippincott, Phila., Pa., pp. 142–143. Copy in Div. 63.